(12) United States Patent
Despesse

(10) Patent No.: US 9,906,021 B2
(45) Date of Patent: Feb. 27, 2018

(54) BATTERY MADE UP OF A CHAIN ASSEMBLY OF MODULES

(71) Applicant: COMMISSARIAT A L'ENERGIE ATOMIQUE ET AUX ENERGIES ALTERNATIVES, Paris (FR)

(72) Inventor: Ghislain Despesse, Saint-Egrève (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 233 days.

(21) Appl. No.: 14/898,051

(22) PCT Filed: Jun. 13, 2014

(86) PCT No.: PCT/EP2014/062435
§ 371 (c)(1),
(2) Date: Dec. 11, 2015

(87) PCT Pub. No.: WO2014/198929
PCT Pub. Date: Dec. 18, 2014

(65) Prior Publication Data
US 2016/0134106 A1    May 12, 2016

(30) Foreign Application Priority Data
Jun. 13, 2013   (FR) ...................................... 13 55501

(51) Int. Cl.
*H02J 1/00*     (2006.01)
*H01M 2/02*     (2006.01)
(Continued)

(52) U.S. Cl.
CPC ............. *H02J 1/00* (2013.01); *H01M 2/0245* (2013.01); *H01M 2/1077* (2013.01); *H01M 2/20* (2013.01);
(Continued)

(58) Field of Classification Search
CPC . H01M 2010/4271; H01M 2010/4278; H01M 10/6583; H01M 2/20; H01M 8/02; H02S 40/34; H02J 1/00
See application file for complete search history.

(56) References Cited

U.S. PATENT DOCUMENTS 8,330,419 B2 * 12/2012 Kim .................. H01M 10/4207
320/117
2009/0071675 A1    3/2009 Hanawa et al.
(Continued)

FOREIGN PATENT DOCUMENTS

WO    2007/100140 A1    9/2007
WO    2009/121062 A1    10/2009

OTHER PUBLICATIONS

International Search Report and Written Opinion dated Jul. 28, 2014 issued in counterpart Application No. PCT/EP2014/062435; with English partial translation and partial machine translation (15 pages).

*Primary Examiner* — Robert Deberadinis
(74) *Attorney, Agent, or Firm* — Westerman, Hattori, Daniels & Adrian, LLP

(57) ABSTRACT

Energy transmission device, notably a battery or energy generating device, having (i) at least one module (20) arranged within a casing (25), with a plurality of independent electrical power links (27, 29) and blocks, each having at least one first electrical power link (27) connected to a pair of connectors (A1, B1) to connect to a connector of a second module, a plurality of cells (21) connected to this first link (27), allowing these cells (21) to be connected to external components by the connectors (A1, B1), and switches (24) to modify the link between cells (21) of the block, (ii) a connection component (57) allowing electrical connection of a plurality of independent links (27, 29) of the at least one module (20), and (iii) a plurality of output connectors (A1,
(Continued)

A2; A1; CP) allowing polyphase electrical linking of the energy transmission device to an outer component.

20 Claims, 9 Drawing Sheets

(51) Int. Cl.
*H01M 2/10* (2006.01)
*H01M 2/20* (2006.01)
*H01M 2/30* (2006.01)
*H01M 10/48* (2006.01)
*H02S 40/34* (2014.01)
*H01M 8/02* (2016.01)
*H01M 10/42* (2006.01)
*H01M 10/6563* (2014.01)

(52) U.S. Cl.
CPC .......... *H01M 2/206* (2013.01); *H01M 2/305* (2013.01); *H01M 8/02* (2013.01); *H01M 10/482* (2013.01); *H02S 40/34* (2014.12); *H01M 10/6563* (2015.04); *H01M 2010/4271* (2013.01); *H01M 2010/4278* (2013.01)

(56) References Cited

U.S. PATENT DOCUMENTS

| | | |
|---|---|---|
| 2009/0242015 A1 | 10/2009 | Wattman et al. |
| 2011/0273132 A1 | 11/2011 | Khaitan et al. |
| 2013/0154549 A1 | 6/2013 | Hanawa et al. |

* cited by examiner

BATTERY MADE UP OF A CHAIN ASSEMBLY OF MODULES

The invention concerns a battery module or an electricity generating element module. It also concerns a battery as such or an electricity generator as such comprising a plurality of modules. It also concerns a method for assembling such a battery or electricity generator and a method for managing such a battery or electricity generator.

Figure 1:
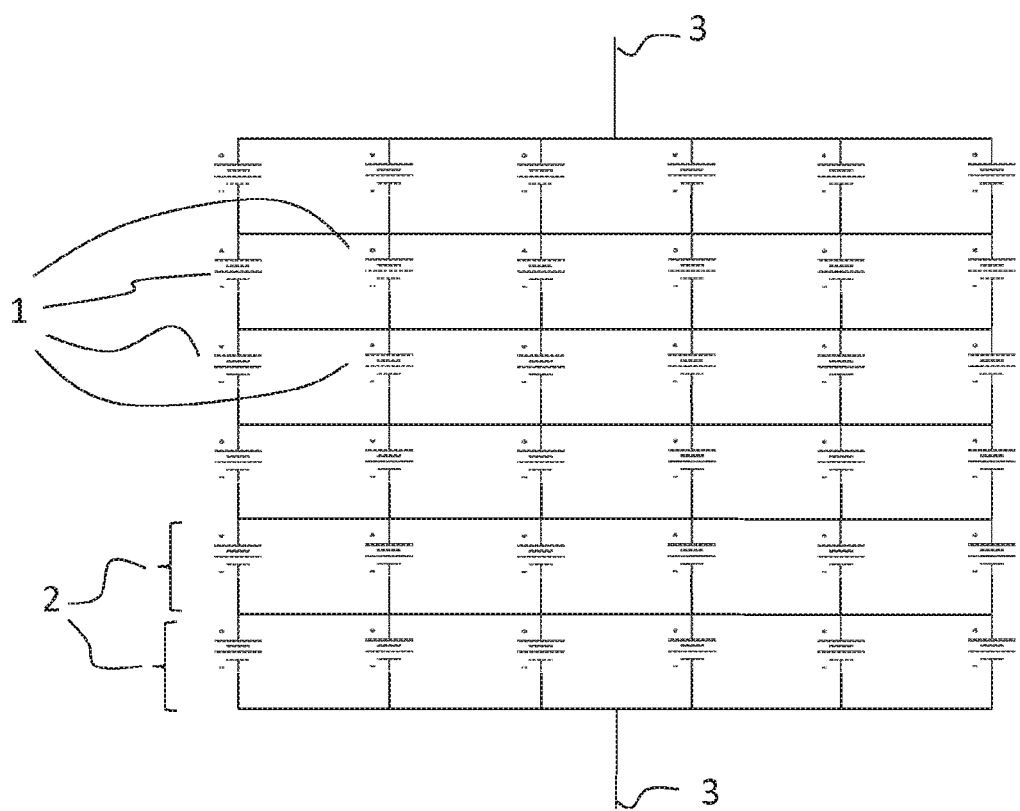

FIG. 1 shows a battery according to the prior art, also called a "battery pack". Such a battery pack, which we will simply call battery below, is made up of a multitude of elementary batteries. An elementary battery, often simply called a cell, comprises an active portion that plays a direct part in the function of storage and release of electrical energy, which may be of chemical nature, for example. This active portion is arranged in a housing, a first external face of which forms the positive terminal or first current collector of the cell and a second external face of which forms the negative terminal or second current collector. The battery, which is shown schematically in FIG. 1, comprises a conventional architecture having a plurality of stages or modules 2, arranged in series, and each module comprises a plurality of cells 1 arranged in parallel. The two modules arranged at the ends of the assembly each respectively form a terminal 3 for linking the battery to the outside, in order to supply power to an outer device, for example, or in order to recharge the battery.

According to a first implementation of the prior art, such a battery is implemented in practice by electrically connecting the various modules 2 by means of electrical wires and connectors, or by means of electrical cables soldered or screwed from module to module. Naturally, such an implementation is complex to produce, not very reliable, because multiplication of the intermediate electrical links increases the risk of failure, and is not very flexible, since the architecture of the battery is difficult to modify once it has been finalized.

According to a second, improved implementation of the prior art, the modules of the battery appear in the form of various independent housings that are mechanically fixed and electrically connected to one another in a removable manner by means of a rack. In their position within the rack, the housings are connected to one another by a power bus arranged within the rack, and can transmit a voltage to output terminals, which are likewise arranged on the rack. Naturally, the rack is initially dimensioned according to the maximum number of modules that a use is likely to demand. Subsequently, even if the need is less, the rack therefore keeps the same bulk. This solution thus keeps the disadvantage of requiring a rack of large and invariable bulk.

The previous observations also apply more generally to an electricity generating element, for example made up of photovoltaic cells or fuel cells, that can have a modular architecture similar to that of the battery and encounter the same technical problems. Thus, we will use the term energy transmission to include both energy storage elements, such as batteries, and energy generating elements, such as photovoltaic devices.

Thus, there is a need for an improved energy transmission solution allowing at least some of the disadvantages of the existing solutions to be resolved, and the aim of the invention is to achieve all or some of the objects that follow.

A first object of the invention is to propose an energy transmission solution that allows reliable and extended operation to be guaranteed.

A second object of the invention is to propose an energy transmission solution that is easily adapted to various demands of use, flexible and user-friendly.

A third object of the invention is to propose an energy transmission solution having minimum bulk.

To this end, the invention is based on an energy transmission device, notably a battery or energy generating device, characterized in that it comprises:
- at least one module arranged within a casing, comprising a plurality of independent electrical power links and a plurality of blocks, each comprising:
    - at least one first electrical power link connected to a pair of connectors, and
    - a plurality of cells electrically connected to this first electrical power link, allowing these cells to be connected to components that are external to the module by means of the pair of connectors, and
    - the pair of connectors, which is arranged on the casing of the module, so as to be capable of electrical connection to an electrical connector of a second module that would comprise a same pair of connectors,
    - switches that are capable of modifying the electrical link between a plurality of cells of the block, notably allowing connection of two cells in series or shunting of one or more cell(s), in order to be able to vary the voltage between the pair of connectors,
- a plurality of output connectors allowing polyphase, notably three-phase, electrical linking of the energy transmission device to an outer component, each output connector being electrically connected to at least one electrical power link of a block of one or more modules of the energy transmission device.

The invention is defined more precisely by the claims.

These subjects, characteristics and advantages of the present invention will be set forth in detail in the following description of particular embodiments provided without limitation in conjunction with the attached figures, among which:

FIG. 1 schematically shows the structure of a battery according to a prior art.

Figure 2:
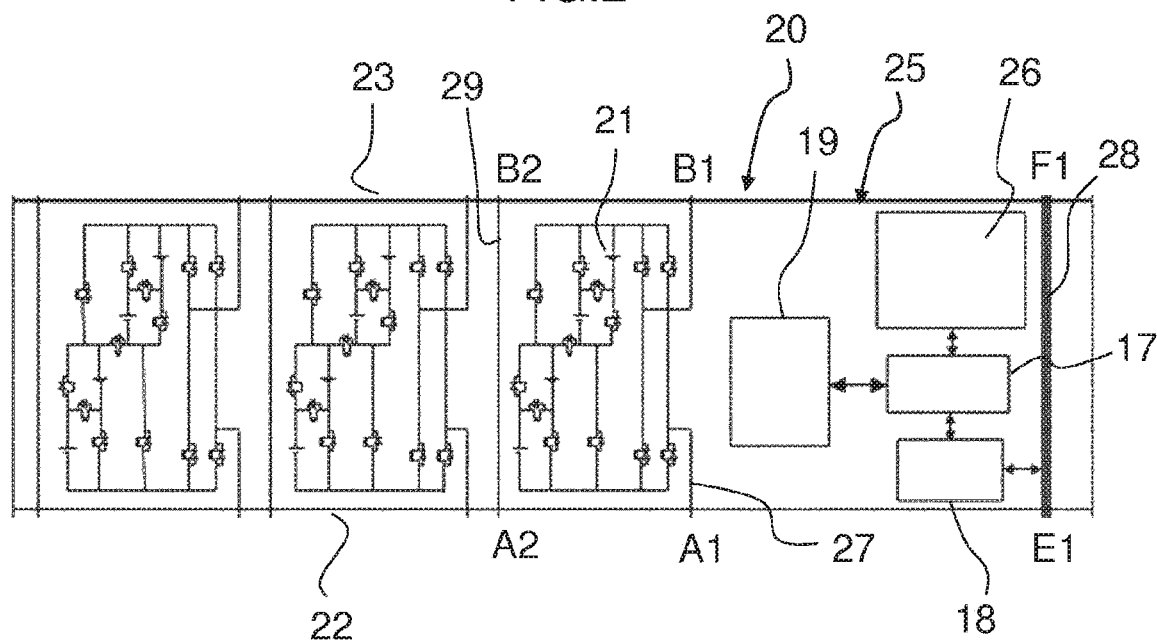

FIG. 2 schematically shows a battery module according to an embodiment of the invention.

Figure 3:
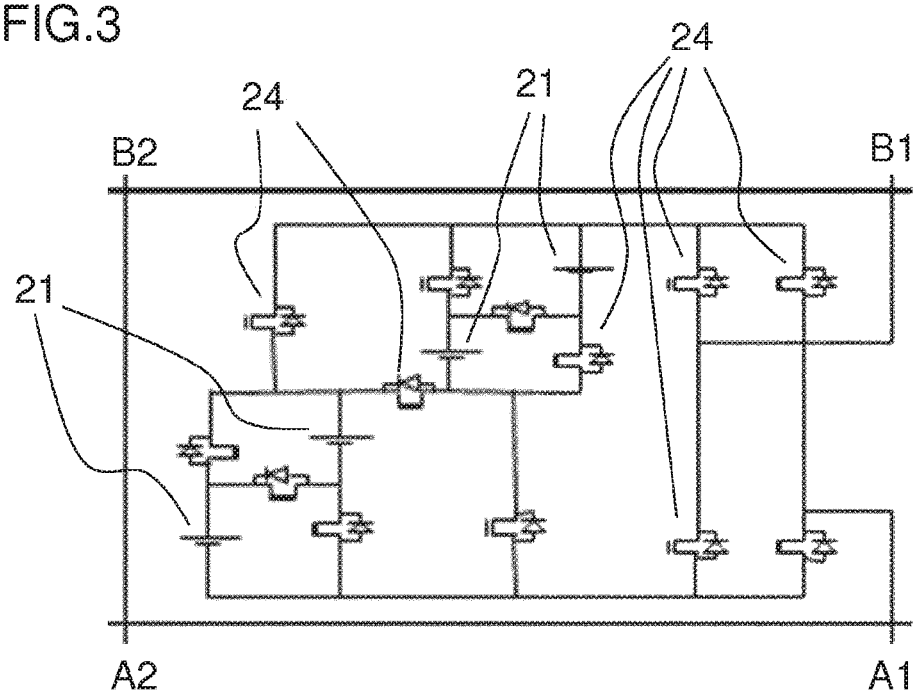

FIG. 3 schematically shows a block of the battery module according to the embodiment of the invention.

Figure 4:
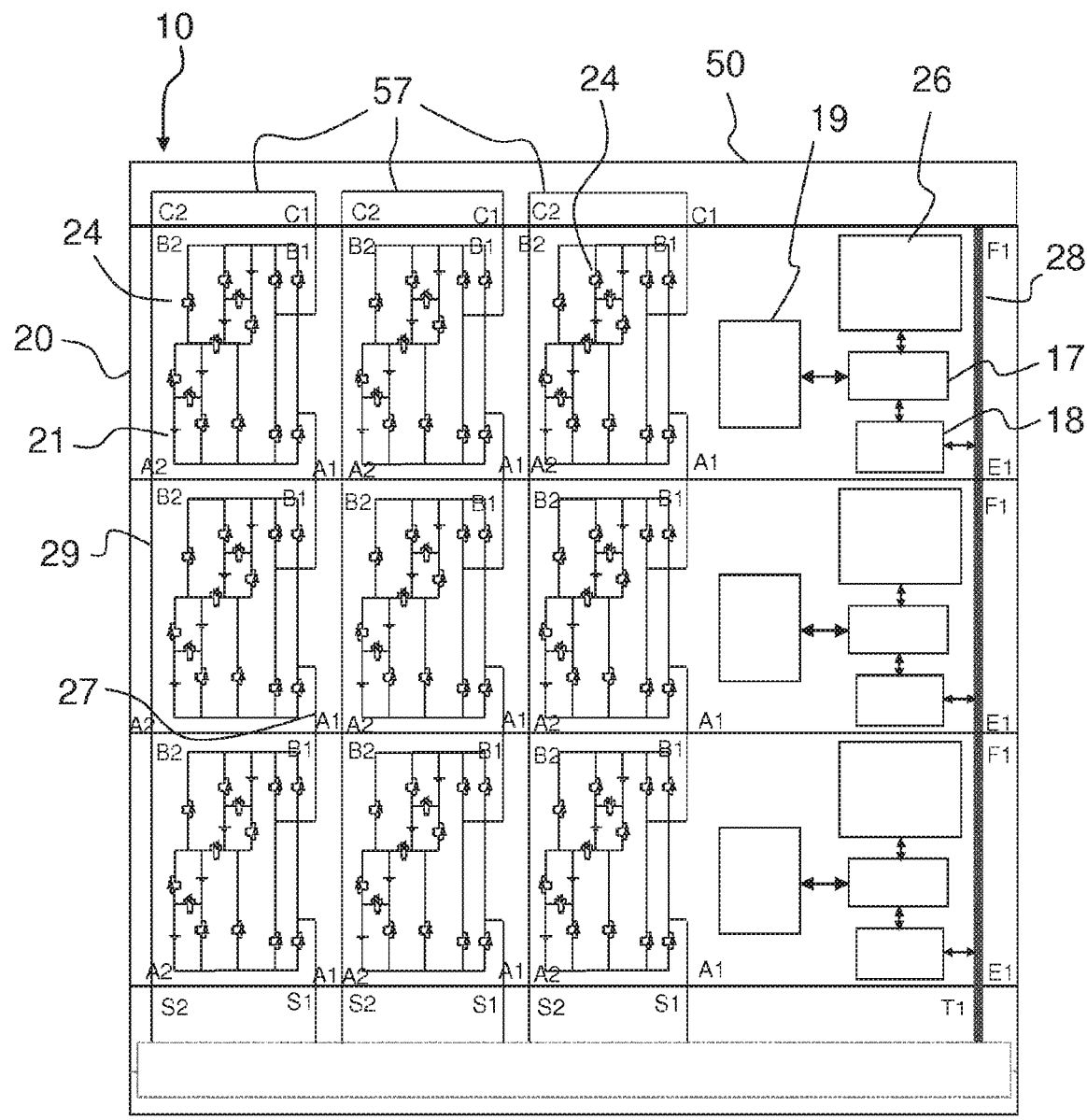

FIG. 4 schematically shows a battery according to a first embodiment of the invention.

Figure 5:
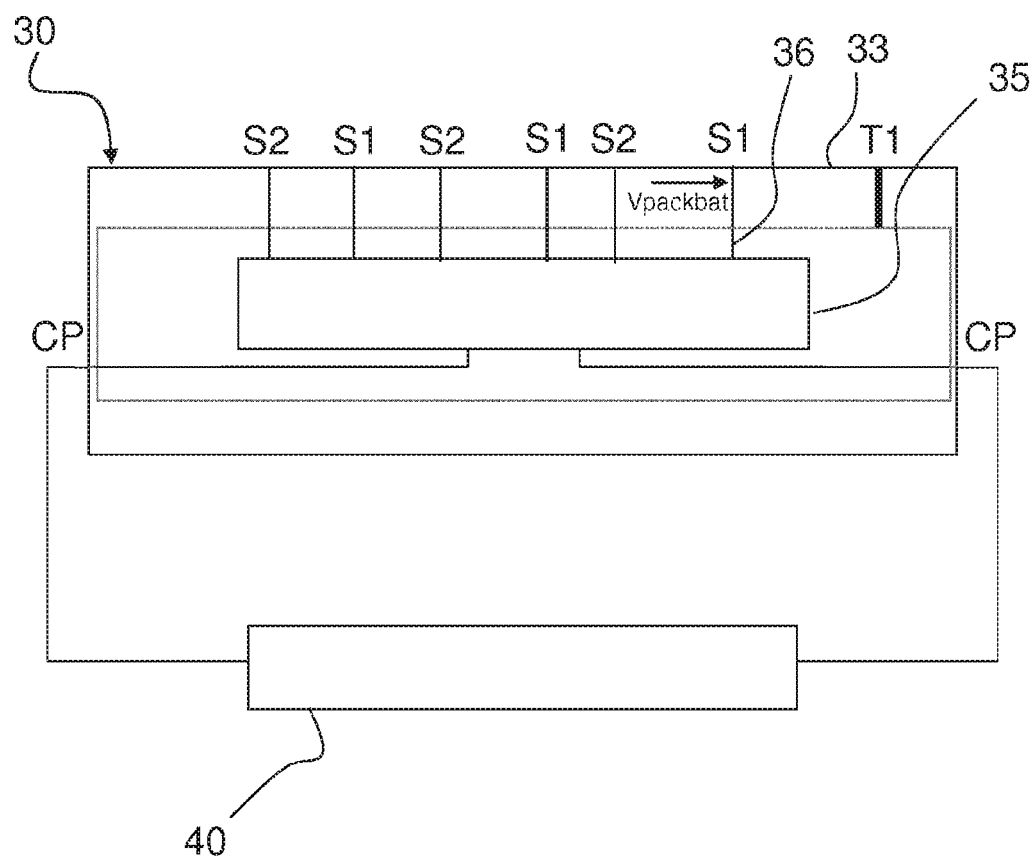

FIG. 5 schematically shows a host support of a battery according to an embodiment of the invention.

Figure 6:
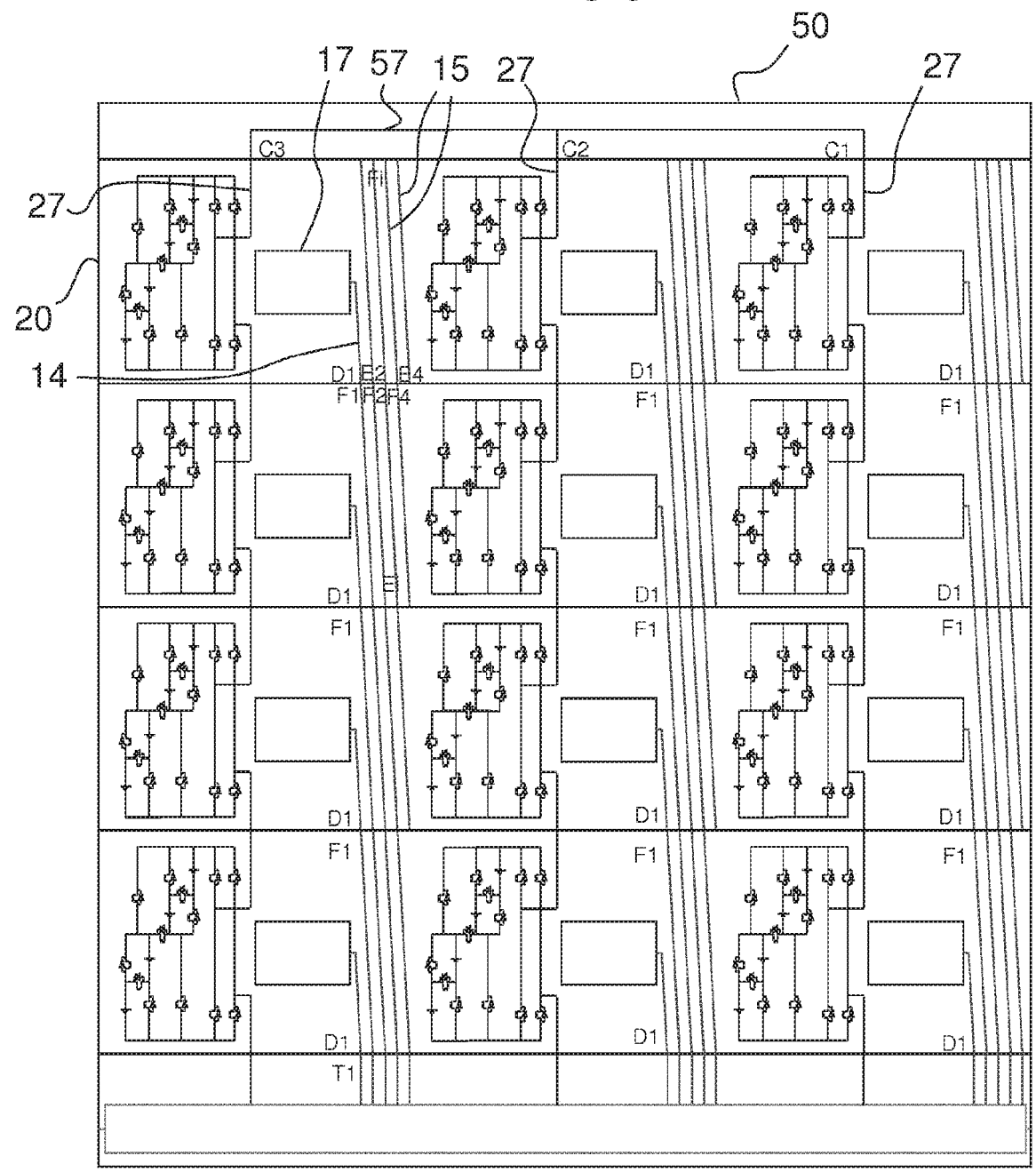

FIG. 6 schematically shows a battery according to a second embodiment of the invention.

Figure 7:
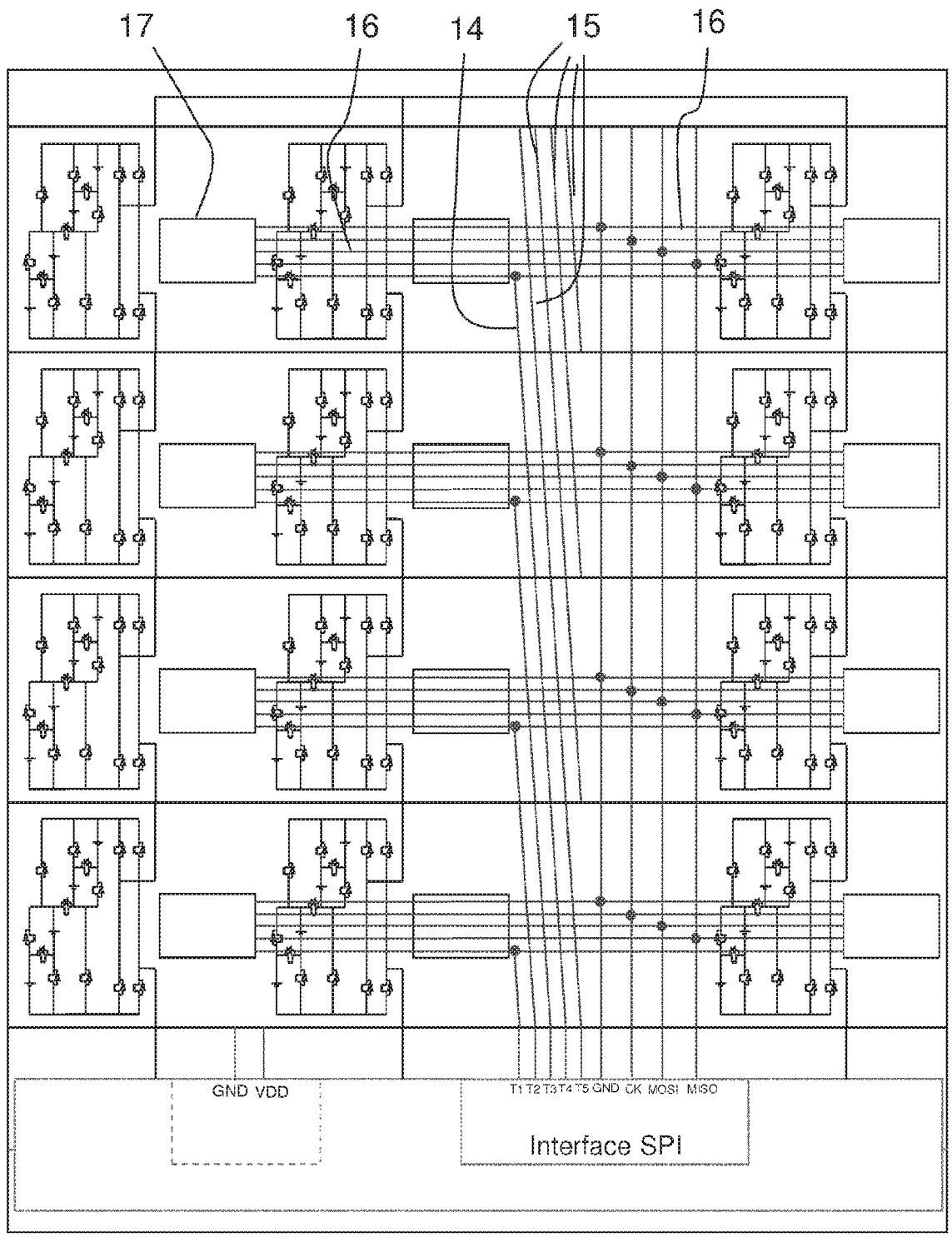

FIG. 7 schematically shows a battery according to a third embodiment of the invention.

Figure 8:
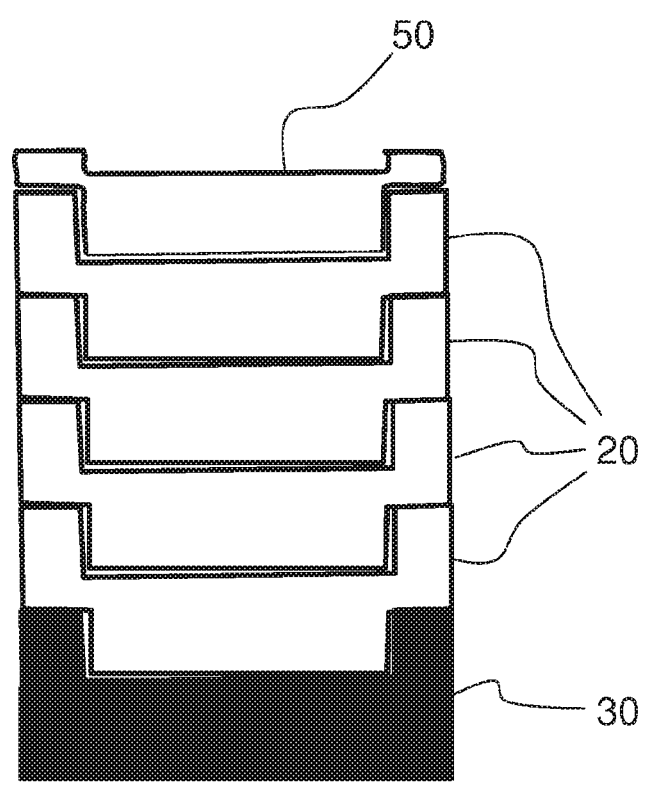

FIG. 8 schematically shows a battery having a different form as a variant of the embodiments of the invention.

Figure 9:
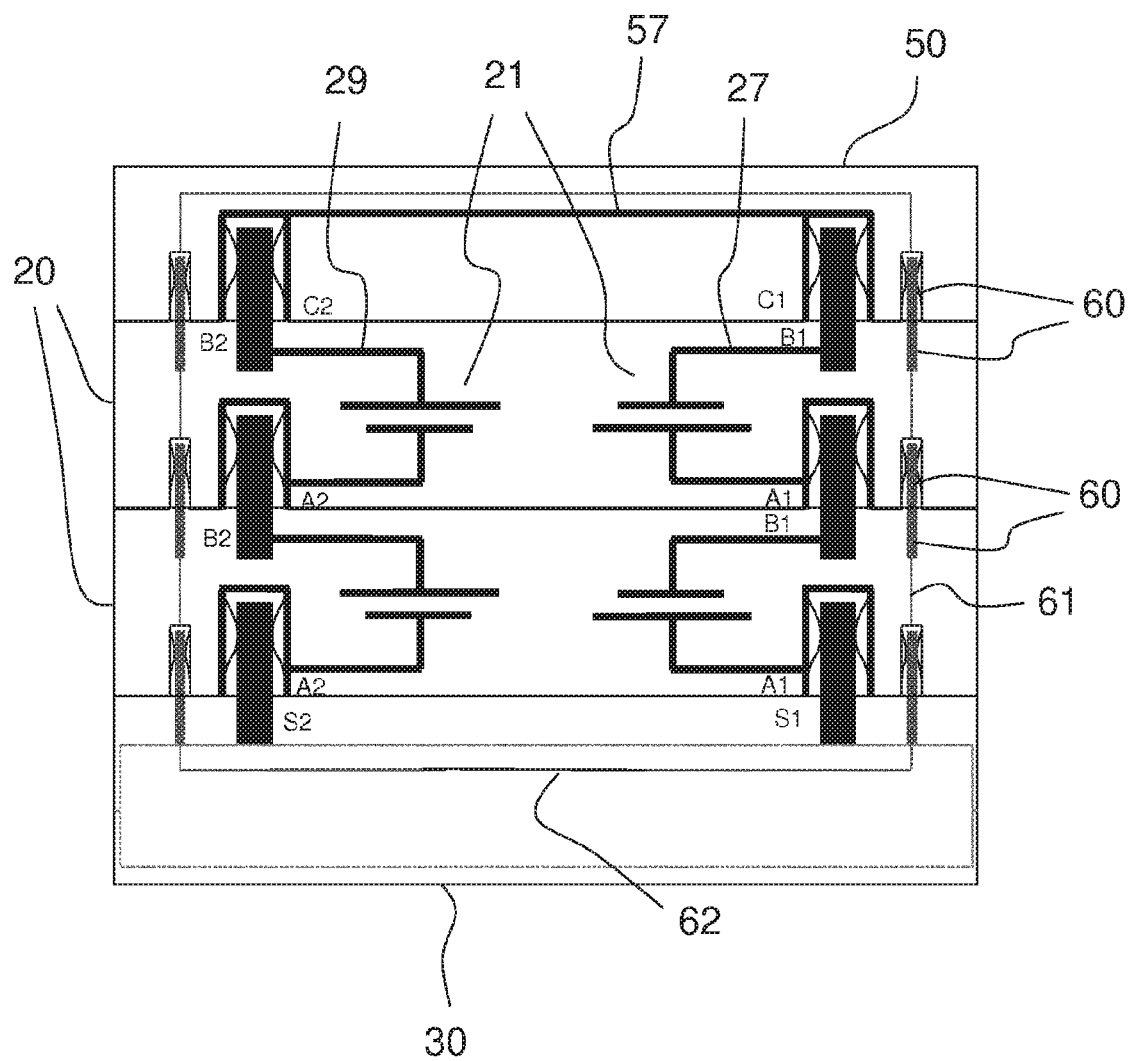

FIG. 9 schematically shows a battery according to a variant of the embodiments of the invention.

Figure 10:
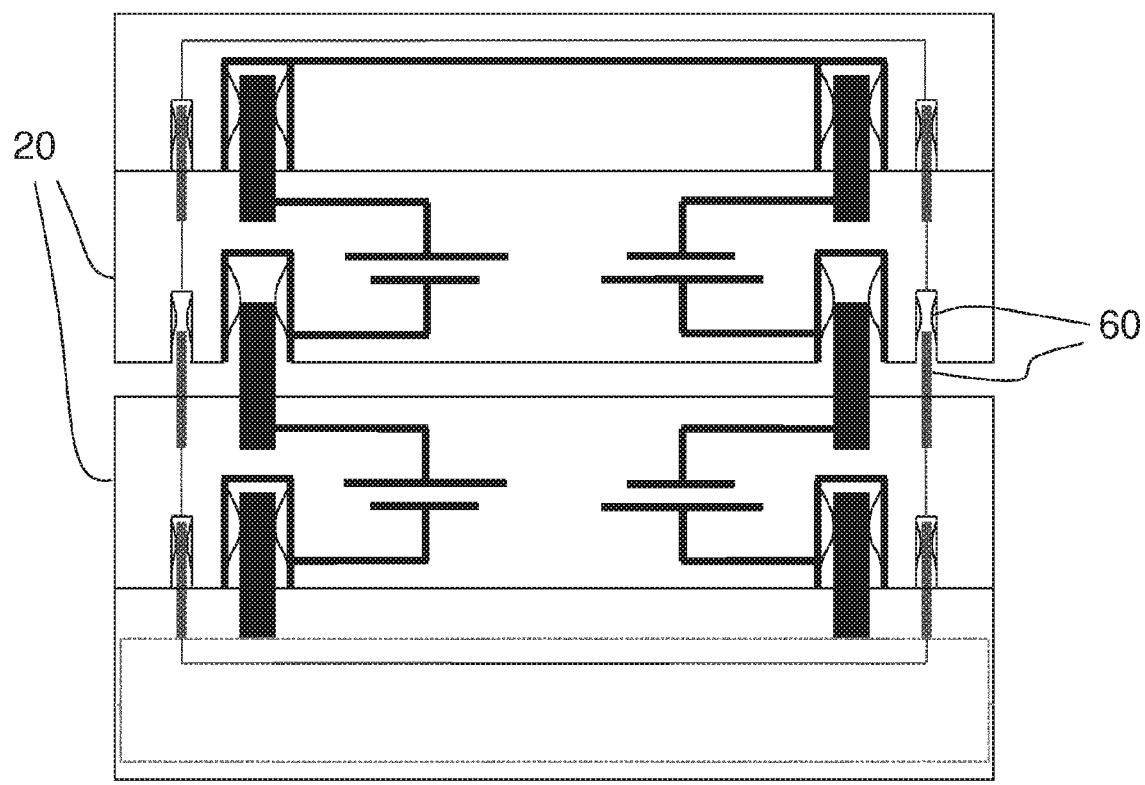

FIG. 10 schematically shows the battery according to the preceding variant of the embodiments of the invention in a configuration that is not perfectly assembled.

In the figures that follow, the same references will be used for identical or similar elements in each embodiment of the invention, in order to simplify the description.

FIG. 2 schematically shows a battery module 20 according to an embodiment of the invention. This module 20 appears as a monolithic physical entity that is separable from the rest of the battery. In this embodiment, it has a parallelepipedal form. It comprises an outer casing (or housing) 25, comprising two flat surfaces 22, 23 that we will describe as lower surface 22 and upper surface 23 by convention in relation to use by means of vertical assembly of such a module, as will become apparent subsequently. Connectors are provided, which are arranged on the outer casing 25 of the module, for assembly of the module 20 with other components in order to form a battery.

Inside the casing 25, the module 20 comprises three blocks forming three independent active assemblies.

Each block, shown more particularly by FIG. 3, comprises a plurality of cells 21, which are arranged on a first electrical power link 27 extending between a first lower connector A1 arranged on the lower surface 22 of the module 20 and a first upper connector B1 arranged on the upper surface 23 of the module 20.

More precisely, it becomes apparent that the active portion formed by a block of a module 20 comprises four cells 21, and a plurality of switches 24 in the form of transistors, which allow modification of the electrical link, notably serial and/or parallel, between the various cells 21. By way of example, the various electrical configurations that follow are possible according to the illustrated embodiment, depending on the open and/or closed positioning of the switches shown:

positioning of the four cells in parallel;
positioning of the four cells in series;
serial positioning of two blocks of two cells arranged in parallel;
serial arrangement of two cells and of a block comprising two cells in parallel;
inversion or non-inversion of the output voltage;
application of a zero output voltage from the module.

If the voltage of a cell is called v, the various configurations listed above can be used to obtain an output voltage from the module, between connectors A1 and B1, varying between −4v and +4v, in steps of v. As a variant, any other arrangement of cells and switches can naturally be envisaged within a module. By way of example, it is possible to have a fully open position in order to electrically isolate all the cells. It becomes apparent, notably immediately, that this design has the advantage of allowing a variable power to be obtained between terminals A1 and B1, whereas each cell supplies a DC voltage, which will notably be used in order to generate signals of sinusoidal type, as will be set out in detail below.

Finally, the block comprises a second electrical link 29 between second connectors A2, B2, which are respectively arranged on the lower surface 22 of the module 20 and on the upper surface 23 of the module 20, respectively. This second electrical link 29 is a simple electrical link that is totally independent of the cells, the function of which will be outlined below.

Moreover, in this embodiment, each module 20 also integrates a switch driver, not shown, a management unit 17, for example comprising a computer, at least one measurement sensor 26 and an element 18 forming DC isolation. It should be noted that the supply of electric power for these components can be organized as mentioned previously, or even directly from at least one of the cells of the module in question. An energy management driver 19 is concerned with managing the internal energy of the various components of the module.

FIG. 4 shows an embodiment of a battery 10, notably formed from a plurality of modules 20 similar to the one described previously, and using a host support 30 and a closure cap 50, which will be set out in detail below. In this implementation, the battery comprises three modules 20 assembled vertically in a chain one on top of the other, above the host support 30, which supports the first module 20 of the assembly. It should be noted that these various modules could differ in terms of the organization of their cells 21.

As becomes clearly apparent in FIG. 4, the superposition of two modules 20 forms an electrical link between the two connectors B1, B2 of the upper surface 23 of the first module, which is positioned beneath the second module, and the two connectors A1, A2 of the lower surface 22 of this second module. For that purpose, the upper connectors B1, B2 of each module 20 are precisely superposed on their lower connectors A1, A2, in order to guarantee the electrical connection between the modules when the battery is assembled. All the modules 20 used thus have the same power connections and the same format. They are thus interchangeable.

In addition, the overall form of each module also promotes their physical, or even mechanical, linking, in addition to the aforementioned electrical connections. As an option, it is possible to envisage guide elements in order to facilitate the respective adjustment of two modules and the correspondence of their connectors that are intended to cooperate.

The host support 30 of the battery, shown particularly by FIG. 5, supports the whole vertical stack of the modules 20. It thus performs the function of a mechanical support for the components of the battery. It also appears in the form of an independent physical entity, also in parallelepipedal form in this embodiment. It comprises three pairs of power connectors S1, S2 on its upper surface 33, which are respectively connected to the pairs of connectors A1, A2 arranged on the lower surface 22 of the first module 20 of the battery, in a battery as shown by FIG. 4.

Finally, the battery comprises a closure cap 50, which likewise appears as an independent physical entity, intended to be positioned at the end of the battery that is opposite the host support 30, the upper end on the vertical stack chosen by this embodiment. This closure cap 50 comprises three pairs of connectors C1, C2 beneath its lower surface, which are respectively connected to the pairs of connectors B1, B2 of the last module 20. Next, it comprises connection components 57 or electrical power links 57, which simply connect the two connectors C1, C2 of each pair. The function of this closure cap 50 is thus quite simply to complete the electrical circuit in order to form a completed power path between the pairs of two power connectors S1, S2 of the host support, by connecting the two electrical power links 27, 29 of each block of each module.

This architecture means that the host support 30 of the battery is thus electrically connected, directly or indirectly, by its pairs of power connectors S1, S2 to all the cells of all the modules of the battery. More precisely, all the first electrical power links 29 of each block of all the modules 20 are connected in series between connectors S1 and C1 of, respectively, the host support 30 and the closure cap 50, forming first power circuits in a first direction. Next, all the second electrical power links 29 of each block of all the modules 20 are connected in series between connectors C2 and S2 of, respectively, the closure cap 50 and the host support 30, forming second power circuits in a second, opposite direction.

The two power circuits are connected in series by means of the closure cap. Thus, each module 20 of the battery has three blocks that are each a portion of a stage of the final battery, belonging to the first electrical power circuit in a first direction, and a second assembly, which forms a separate stage of the final battery, belonging to the second electrical power circuit in a second direction, which is opposite the first. In this implementation, each block of each module therefore carries two independent electrical power circuits that are intended to carry currents in opposite directions at each instant.

Thus, each module finally comprises six electrical power links, two power links forming power circuits in one direction and the other direction for each active portion. The battery 10 thus comprises three independent power paths, each comprising an electrical circuit in a first direction and an electrical circuit in a second direction, these two circuits passing through all the modules. The host support thus receives the power from these three power paths: this solution is thus adapted for three-phase operation, notably for the supply of power for a three-phase motor, and for recharging on a three-phase electrical network.

The reason is that each module 20 is capable of supplying a variable voltage, which allows the whole of the battery to generate a variable voltage, on each phase, to a greater or lesser extent according to the number of modules and/or cells that are used. The reason is that, by combining the various electrical configurations of each module, which are described above, for each module of the battery, the latter rapidly has a large number of possible configurations, and of output voltages and/or currents between the two power connectors S1, S2. Notably, it is possible to generate a DC voltage or a variable voltage, notably a voltage close to an AC voltage, by managing the voltage variations of the various modules of the battery in a suitable manner over time.

This battery can thus supply a motor with alternating current directly. Similarly, the battery can be charged by means of an AC voltage connection, on a three-phase electrical network. For that purpose, it is sufficient to modify the configuration of the battery in real time, by actuating the switches of the various modules, in order to arrive at the number, computed at any instant, of cells in series or parallel in order to attain the load voltages and currents that are desired within each cell. In this approach, the no-load voltage of the battery always remains fixed slightly below the power supply voltage, in order to ensure a current flowing from the power supply to the battery, and more precisely to the modules and/or cells that are to be recharged. The mean deviation between the power supply voltage and the no-load voltage corresponds to a resistive voltage drop whose mean value allows the mean recharging current to be adjusted. An inductance between the voltage source and the battery pack can be added in order to smooth the current.

In the battery architecture described, it therefore becomes apparent that the cells 21 of any given module 20 of the battery shown in FIG. 4 are finally electrically connected to the host support 30. The electrical links 27, 29, mentioned previously, of the modules 20 are therefore electrical links adapted for the transmission of power from or to the cells of the battery, and this is the reason that we call them electrical power links. By way of example, they can be subjected to currents of several amps, or even several hundred amps. Their dimensions must notably be adapted to the flow of this current, namely have a section of flow of the current that is sufficient for there to be no significant heating due to the Joule effect. They are naturally adapted to the flow of an alternating current, for the implementation of a conventional three-phase solution.

The host support 30, as shown in FIG. 5, moreover comprises electrical power links 36, connected to two output connectors CP, that allow the battery to be connected to an outer device, in order to supply power to a load 40, for example, as shown in FIG. 5, which does not show the modules 20 in order to make the figure clearer. Optionally, an internal DC/DC or AC/DC converter 35 can be arranged between their power connectors S1, S2 and the output connectors.

The host support 30 receives on each phase, between two power connectors S1, S2, the potential difference Vpackbat between the stage of highest potential and the stage of lowest potential of the battery. Finally, it becomes apparent that the battery as shown in FIG. 4 has, between its two power connectors S1, S2, an electrical architecture that is finally similar to that in FIG. 1 but adapted to a three-phase solution, and having the numerous advantages that will be set out in detail below.

In the embodiment described, the battery moreover integrates a communication function, using a communication link. For that purpose, each module 20 comprises a communication link 28, arranged between two communication connectors E1, F1 that are arranged on the lower and upper surfaces 22, 23, respectively, of each module. The connector F1 of a first module is connected to the connector E1 of a second module, these two connectors thus being perfectly superposed in each module. The connection of all the communication links 28 of the various modules forms a communication bus for the battery, which communication bus is connected to the host support 30 by a communication connector T1 arranged on the upper surface of the latter, and connected to the lower communication connector E1 of the first module of the battery.

Finally, each module comprises at least one measurement sensor 26, connected to the communication link 28 of the module so as to transmit its measurements to outside the module. This at least one measurement sensor 26 arranged within a module may, by way of example, be a sensor for temperature, and/or for voltage, and/or for current. The communication bus can thus be used to transmit temperature measurements to the host support 30, and/or a voltage measurement at the terminals of one or more cell(s) and/or of the module, and/or a current measurement.

In this embodiment, the host support advantageously comprises a management unit, not shown, comprising at least one computer, which implements a method for managing the battery taking account of the various measurements received from the modules by the communication bus, from hardware and/or software devices. In return, this management unit returns control orders to the modules, such as an order to activate a fan in order to deal with a rise in temperature within a certain module, or an order to electrically isolate a module and/or one or more cells of the module, for example by means of at least one switch arranged within the module. In addition, the communication bus can transfer a small supply of electric power, for supplying power to one or more sensors, and/or to a fan, and/or to internal components, to a module requiring a supply of electric power. It should be noted that this supply of electric power, which is transmitted by the host support, advantageously stems from the power of at least one cell of the battery, which leaves the battery autonomous. It should be noted that a DC isolation element (galvanic isolation) is advantageously arranged between the communication bus and each module, in order to limit any electrical risk. Moreover, each module can comprise a computer, used to manage communication, notably performing the function of timing measurements, processing them and adapting them to suit the communication protocol of the communication bus. The supplies of electric power and the communications flowing on the communication bus are by nature very remote from the power currents mentioned previously, and have an architecture and a function that are totally different.

FIG. 6 shows another battery embodiment, in which each module also comprises three blocks forming independent active portions similar to those of the preceding embodiment, for the purpose of providing a three-phase power. However, in this implementation, the three separate electrical return circuits, which, in the preceding implementation, are formed by the serial linking of three independent electrical links 29 of each module, are avoided. The reason is that the three electrical power links 27 of each active portion are simply connected to one another by three connectors C1, C2, C3 connected to an electrical link 57 of the closure cap 50. This architecture corresponds to three-phase star operation, in which the mid-point corresponds to the potential of the electrical link 57 internal to the closure cap 50.

This embodiment also differs from the preceding embodiments by virtue of the architecture of its network of communication links. The reason is that each module 20 comprises one management unit 17 per active assembly connected by a first communication link 14 to a supplementary management connector D1 arranged on the lower surface 22 of a module. Second communication links 15, which are independent of these first communication links 14, pass through each module 20 between communication connectors Ei and Fi arranged on the lower surface 22 and the upper surface 23, respectively, of each module 20, which are not all shown in detail so as not to weigh down the figure. These communication links 15 are totally independent of the management unit 17 and of its communication link 14. The term "independent" therefore means that these communication links 15 have no physical tie to the management unit 17 and its communication link 14, have no point at which the potential, which is not zero, would be dependent on at least one cell 21 of this module 20 or of the management unit 17. This communication architecture is reproduced as before for each active assembly participating in each phase of the battery, therefore being tripled in this implementation.

As becomes apparent in FIG. 6, two juxtaposed modules implement both electrical power links, as mentioned previously, but also communication connectors, the communication connectors Ei arranged on the lower surface of one module linking to the communication connectors $Fi_{+1}$ arranged on the upper surface of the other module, and the management connectors D1 cooperating with the first communication connector F1. In this implementation, it becomes apparent that all the management units 17 of all the modules are linked by communication links to the host support 30, which is also arranged to have supplementary connections Ti cooperating with all the communication connectors on the lower face of the first module of the battery.

In this embodiment, the second independent communication links 15 of a module are substantially parallel and inclined in order to finally allow their lower connector Ei to be superposed with an upper connector $Fi_{+1}$. With an implementation of modules comprising four second independent communication links 15, it becomes apparent that it is possible to build a battery having no more than five superposed modules 20. Naturally, the same principle can be implemented for any other number of independent communication links 15 and associated connectors Ei, Fi. In this way, it becomes apparent that each management unit 17 is connected to the host support by means of its communication link 14 and then by any independent communication links 15 of the modules that are situated between the module under consideration and the host support, these independent communication links 15 being used solely to pass through said modules, without performing a specific function for said modules. This architecture thus allows all the modules to communicate without setting up a communication bus as described in some of the preceding embodiments. It should be noted that the communication architecture is tripled in this case, in order to obtain one of them per phase. The same approach could also be implemented as a variant of the communication bus described in the preceding embodiments.

In this embodiment, a centralized intelligence of the battery, which is integrated in the form of software and/or hardware within the host support 30, can communicate directly with each of the phases of each of the modules, in a separate manner, via a (or even, as a variant, a plurality of) dedicated communication link(s).

As a variant, instead of having a direct communication link to each phase of each module, it is possible to envisage a single communication link to each module, and then to integrate an internal element in each module, the function of which is to direct the information to the phase in question. By way of example, this directing could be implemented by means of an address held in the data that transit through the communication link, which may be a serial bus.

FIG. 7 shows a third embodiment of a battery, which differs from the preceding embodiment by virtue of the organization of its communication network. In this implementation, a communication bus of SPI type is implemented. This bus thus comprises:

an earth line (GND), a clock line (CK), a send line (MOSI), a return line (MISO), these lines being common to each phase of each module. For that purpose, each module provides internal links 16 from the management unit of each phase to these communication lines;

in addition, a supplementary communication link connects the various units of each module to the host support. Various independent communication links 15 are arranged within each module according to the principle explained with reference to the preceding embodiment. However, in this variant, internal communication links allow this principle to be implemented once for all the phases, which limits the number of connectors needing to be provided on the casing of the modules.

In this embodiment, elements forming DC isolation, which are not shown, are advantageously arranged on the links between the various management units 17 and the communication links, because these units are likely to operate at very different potentials. By way of example, this DC isolation can be provided by using optocouplers, transformers, capacitive links, radio modules, etc.

Developed architectures, for example those of the embodiments illustrated by FIGS. 5 to 7, allow a method for advantageously managing a battery to be implemented, which can be controlled by a management unit of the host support and/or of the modules, which is furnished with hardware means, such as at least one computer and a memory, and software means.

This management method notably implements a step of balancing of the voltage of the various modules. For that purpose, the modules that have the most charge, which are detected by virtue of the voltage received and measured by the management unit, are used as a matter of priority. The reason is that the mechanism of placing or not placing the module in series with the rest of the battery, by means of the set of switches explained previously, allows each module finally to be or not to be used at a given instant. It is thus possible to separate a module that is more discharged than the others for the time that is necessary in order to obtain rebalancing of the voltages of the modules. The modifications of the use or non-use of the various modules can be made periodically, according to a duty cycle that is computed for each module so as to obtain balancing of the modules of the battery. This principle can even be applied to each cell or group of cells within each module. Similarly, the charge of the battery implements a more extensive charging step for the modules that have the least charge, by placing them in series during this charging phase as a priority and/or for an overall period that is longer than for other modules having more charge.

The management method also implements a step of real-time or quasi-real-time adaptation of the output voltage of the battery according to the need of a device 40 that is to be supplied with power. For that purpose, the management unit disconnects or does not disconnect some of the modules from their serial link to the other modules, and/or modifies the configuration of the battery at the various cells that make it up, as explained previously. This management unit can thus manage the various cells of each block in order to obtain a three-phase output, in which each phase has a substantially sinusoidal output signal. With the proposed modular approach, it is possible to generate polyphase signals, with amplitudes that are adjustable according to the number of modules connected.

Naturally, the host support 30 described previously can have other forms and inner architectures. It is adapted to the connections and to the structure of the modules. By way of example, it can manage a three-phase output as explained above. It can also comprise communication connections (Ti). These communication links can be connected to an internal management unit, allowing it to receive sensor measurements, for example for temperature, voltage and/or current, from all or some of the modules and/or cells, in order to set up diagnostics for the various modules and/or cells in question and to use these data in the management of their use and/or their charge.

Thus, the architecture of a battery as described by the preceding embodiments duly achieves the intended objects and attains the following advantages:

- it is possible to build a flexible modular structure, by forming an assembly of simple modules, without resorting to a rack;
- a user can make do with the number of modules that is sufficient for a particular use;
- the bulk obtained is therefore limited to the modules that are actually necessary;
- it is possible to stack any number of modules, without theoretical limit, in order to attain the electrical characteristics that are necessary;
- it is possible to easily replace a defective module, without challenging the rest of the components of the battery;
- in the implementations described, all the modules can be assembled in any order, by means of their simple superposition;
- the solution allows a three-phase output to be provided, by means of three variable voltage phases, and a three-phase voltage to be accepted at the input.

All the modules described in the preceding embodiments can be subjected to numerous modifications and variants without departing from the concept of the invention. Notably, the various connectors can take various forms and be arranged at various locations on the casing 25 of a module, which are not necessarily limited to the upper and lower surfaces. Moreover, these modules can also appear in any other format, so long as it allows them to be fitted together as described previously. To this end, FIG. 8 schematically shows a variant implementation based on a different form of the modules. As a variant, the modules could be assembled in a lateral direction, in addition to or as a replacement for the vertical stacks shown.

Furthermore, the active portion of the modules can be arbitrary and comprise any electrical organization and any number of cells. The term module must be understood in the broad sense and can correspond to any battery subassembly. As a variant, it is also possible to imagine assemblies of modules that are not necessarily all identical but that may also have different formats and/or different internal structures, so long as their format remains compatible and allows them to be assembled mechanically and electrically. Naturally, the various embodiments described can be combined with one another in order to provide other variants and other embodiments.

It should be noted that all or some of the cells of a battery as described previously can be associated with a local energy source, for example of solar sensor, thermal sensor, mechanical/electrical converter, fuel cell, etc., type, in order to take advantage of this source for recharging it, for example, and/or in order to provide additional options for the supply of energy by the battery.

The storage element may be a battery, but also a capacitance, a motor/alternator associated with a flywheel or any other electrical storage element.

Furthermore, the embodiments have been described with a cap 50, which appears in the form of a rigid rack. As a variant, this cap can be replaced by any electrical link performing an equivalent function, notably simple wiring. Thus, the embodiments described can, as a variant, comprise any connection component 57 allowing the connection of electrical power links of one or more modules. For that purpose, this connection component electrically connects at least two electrical power links of each module.

Similarly, the embodiments have been illustrated with a support, which has the advantage of separating certain functions: the support takes care of the management and the linking to an external load, whereas the various modules, which comprise the active cells, in contrast to the support, which does not comprise any, perform the function of generation and/or storage of energy. However, this support could be eliminated. In this simplified variant, a load could be directly connected to the first module of the assembly, by any means, such as simple wiring. Thus, the battery therefore comprises output connectors, which can correspond, in a simplified implementation, to connectors that are arranged directly on a casing of a module of the battery. Moreover, the various management functions, which are integrated within the support, could be transferred and distributed directly within one or more modules of the battery. Notably, an advantageous variant implementation consists in providing a management unit within each module, which is sufficiently autonomous to control all the switches of the module.

Moreover, the embodiments have been described in a three-phase approach. Naturally, other variant implementations can be implemented for a polyphase device, the number of phases being able to be arbitrary.

Finally, each module block has been illustrated with its cells arranged on one and the same electrical power link, a second link being present and independent of all the cells where appropriate. As a variant, it is possible to arrange cells on the second electrical power link, in order to form two electrically independent assemblies, which therefore means that the two electrical links 27, 29 have no physical tie, that the respective cells 21 of the two assemblies have no direct electrical link between them within the casing 25 of the module 20.

According to another variant, all the preceding architectures have been described within the context of a battery, but could also apply to an energy generating device, as mentioned initially, said cells no longer being energy storage cells but rather energy generation cells, for example of photovoltaic type, which are possibly associated with energy storage components.

By way of example, one envisaged embodiment can consist of an association of photovoltaic modules, comprising a block structure as described previously in order to be able to generate a plurality of signals and form a polyphase generator, preferably generating a plurality of AC signals at the output. In addition, the modules are also connected to one end of the assembly by simple electrical wires forming a connection component, allowing the electrical power links of the modules to be completed, in a manner similar to the cap described previously. Moreover, the first photovoltaic module of the assembly is capable of being connected directly to a load.

The invention also relates to a method for assembling (design, manufacture) a battery, comprising a step of determination of the number of modules that are necessary according to a predetermined use, and then connection of the necessary modules to one another in the form of a chain of modules, and connection of the first module in the chain of modules to a host support and of the last module to a closure cap. Among the advantageous uses of such a battery, it is possible to cite the supply of power to a transport vehicle, such as a car, a bus, a boat, a motorcycle, etc., or the implementation for supplying power to a piece of portable electric hardware, a base station for telephony, an emergency generator, etc.

A technical problem arises when assembling an energy transmission device as described. The reason is that, if a module is badly positioned, the power path risks being cut, and the various power or communication connections then become uncertain and unreliable. In order to overcome this technical problem, a solution is proposed with reference to FIGS. 9 and 10, which solution can be implemented on all the embodiments described previously. For that purpose, the various components of the device are fitted with supplementary connectors 60 and electrical links 61. When the various components are correctly positioned, as shown by FIG. 9, a detection circuit 62 detects that a closed electrical loop is formed. This detection can be effected by measuring the electrical continuity of the loop, for example by simply checking that an electric current can flow therein.

In any bad configuration, as shown by FIG. 10, in which the two modules 20 are insufficiently close, the device will therefore allow detection of the anomaly, for example on the management unit centralized within the host support 30. In such a situation, an immediate and automatic decision can be made to stop using the device. The reason is that such action also allows the device to be made safe, because this configuration can take place at the moment at which a module or the closure cap is removed, for example.

As a variant implementation, a light-emitting diode (or any other indicator) can be placed in series on the detection circuit 62. During the continuity test, a flow of current thus allows a user to see the state of the device according to whether or not the diode is lit. The diode(s) can be placed anywhere on the detection circuit 62: on the closure cap 50, on one or more module(s), on the host support, or even outside via an extension of the detection circuit.

In order to optimize the effectiveness of detection of the start of removal of a module or of the closure cap, it is worthwhile to place the connectors of a module of the detection circuit remotely from one another. By way of example, these connectors can be placed in opposite corners in the case of square or rectangular upper and/or lower surface modules.

Advantageously, the electrical contact in the connectors of the detection loop is cut before the power path(s) open(s) so as to detect the opening of the power path(s) in advance and to control stopping of the current before the power path is insufficient or broken and to avoid any risk of overheating or electric arcs on the power connectors.

The invention claimed is:

1. Energy transmission device, comprising:
   at least one module arranged within a casing, comprising
      a plurality of independent electrical power links and a plurality of blocks, each comprising:
         a pair of connectors, which is arranged on the casing of the module, so as to be capable of electrical connection to an electrical connector of a second module that would comprise a same pair of connectors,
         at least one first electrical power link connected to the pair of connectors,
         a plurality of cells electrically connected to the first electrical power link, allowing the cells to be connected to components that are external to the module by the pair of connectors, and
         switches that are capable of modifying an electrical link between cells among the plurality of cells of the block, in order to be able to vary a voltage between the pair of connectors,
   a connection component allowing electrical connection of a plurality of independent electrical power links of the at least one module, and
   a plurality of output connectors allowing polyphase electrical linking of the energy transmission device to an outer component, each output connector being electrically connected to at least one of the electrical power links of at least one of the blocks of the at least one module of the energy transmission device.

2. The energy transmission device according to claim 1, comprising at least one management unit that controls opening and closing of the switches arranged within the module in order to obtain a variable signal on each phase of the energy transmission device.

3. The energy transmission device according to claim 2, wherein the at least one management unit generates an AC signal on each phase of the energy transmission device.

4. The energy transmission device according to claim 2, comprising a management unit in each module that controls the switches of the module.

5. The energy transmission device according to claim 1, comprising:
   a module comprising a block comprising at least one first electrical power link and at least one second electrical power link that are independent and respectively connected to two pairs of separate connectors, the two pairs of connectors being arranged on the casing of the module, allowing connection of the cells of the block to components that are external to the module, the two pairs of connectors being arranged on the casing so that one of the pairs of connectors is capable of electrical connection to the first pair of connectors of another, similar module, a connection component allowing connection of the two electrical power links of each block of each module, and a plurality of pairs of connectors allowing polyphase electrical linking to an outer component, each pair of connectors being connected to the power links of a block of one or more modules of the energy transmission device.

6. The energy transmission device according to claim 1, comprising at least one module comprising at least one second electrical power link extending between second connectors of the module in the form of a simple electrical power link that is independent of any cell of the module.

7. The energy transmission device according to claim 1, comprising at least one module having a communication link and communication connectors in order to allow communication exchanges with an entity outside the module.

8. The energy transmission device according to claim 7, wherein:

each of the modules comprise a communication link connected to a communication link of neighbour(s) of the module in order to form a communication bus passing through all the modules of the energy transmission device, or each of the modules comprise a communication link connected to a communication connector of the module and second independent communication links extending between two communication connectors of the module, and wherein the energy transmission device comprises a control unit connected by a communication link to at least one module, in a manner capable of at least one action selected from the group consisting of (i) transmitting orders thereto and (ii) receiving information.

9. The energy transmission device according to claim 1, comprising at least one module that comprises all or some of:

a management unit;

at least one measurement sensor for at least one of temperature, current and voltage;

an element forming DC isolation between a communication link and a rest of the module;

an energy management driver;

a switch driver;

a fan.

10. The energy transmission device according to claim 1, wherein each block of each module comprises an electrical power link, and wherein the electrical power links of all the blocks are connected by a connection component in order to form a three-phase star architecture.

11. The energy transmission device according to claim 1, comprising a host support, wherein the host support comprises pairs of power connectors in order to receive power transmitted by all or some of at least one cell of at least one module electrically connected to the host support by pairs of connectors of the module cooperating with power connectors of the host support, wherein the host support comprises output connectors in order to connect the energy transmission device to an external device that is to be supplied with power, and wherein the host support:

comprises a control unit connected by a communication link to at least one module of the energy transmission device, which is capable of transmitting orders thereto and of receiving measurement information; and/or comprises at least one DC/DC or AC/DC converter; and/or receives the stack of modules of the energy transmission device; and/or does not comprise any cells.

12. The energy transmission device according to claim 1, wherein each module is in a monolithic format with the casing within which connectors are arranged.

13. The energy transmission device according to claim 12, wherein the modules have a parallelepipedal form, comprising connectors arranged on a flat upper surface and on a flat lower surface thereof, allowing the modules to be stacked vertically.

14. The energy transmission device according to claim 1, wherein the modules comprise connectors linked to electrical links allowing the formation of a detection circuit allowing detection of correct or incorrect assembly of the energy transmission device.

15. The energy transmission device according to claim 1, comprising a closure cap comprising at least one connection component in the form of an electrical power link connecting two power connectors, the closure cap being electrically connected to a module by connectors of the module cooperating with connectors of the closure cap, so that the electrical power link of the closure cap completes a power path between two electrical power links of said module.

16. The energy transmission device according to claim 1, wherein the switches allow connection of two cells in series or shunting of one or more cell(s) in order to be able to vary the voltage between the pair of connectors.

17. The energy transmission device according to claim 1, wherein the plurality of output connectors allow three phase electrical linking of the energy transmission device to the outer component.

18. Method for assembling an energy transmission device, comprising:

determining a number of modules that are necessary according to a predetermined use; and then connecting the necessary modules to one another in the form of a chain of modules, so as to form an energy transmission device according to claim 1.

19. Method for managing an energy transmission device, comprising:

adapting in real-time or quasi-real-time a voltage of the energy transmission device according to claim 1, by connecting or disconnecting modules and/or cells by at least one management unit.

20. The method for managing an energy transmission device according to claim 19, wherein the adapting in real-time or quasi-real-time is performed in order to obtain a three-phase output at the output connectors of the energy transmission device.

* * * * *

UNITED STATES PATENT AND TRADEMARK OFFICE
CERTIFICATE OF CORRECTION

PATENT NO. : 9,906,021 B2
APPLICATION NO. : 14/898051
DATED : February 27, 2018
INVENTOR(S) : Ghislain Despesse It is certified that error appears in the above-identified patent and that said Letters Patent is hereby corrected as shown below:

In the Claims

Change Claim 8 at Column 13 Line 18 - 35 From:
8. The energy transmission device according to claim 7,
wherein:
    each of the modules comprise a communication link
        connected to a communication link of neighbour(s) of
        the module in order to form a communication bus
        passing through all the modules of the energy trans-
        mission device,
    or
    each of the modules comprise a communication link
        connected to a communication connector of the module
        and second independent communication links extend-
        ing between two communication connectors of the
        module, and
    wherein the energy transmission device comprises a con-
        trol unit connected by a communication link to at least
        one module, in a manner capable of at least one action
        selected from the group consisting of (i) transmitting
        orders thereto and (ii) receiving information.

Such that Claim 8 now reads as:
8. The energy transmission device according to claim 1,
wherein:
    each of the modules comprise a communication link
        connected to a communication link of neighbour(s) of
        the module in order to form a communication bus
        passing through all the modules of the energy trans-
        mission device, Signed and Sealed this
Nineteenth Day of May, 2020

Andrei Iancu
*Director of the United States Patent and Trademark Office* or each of the modules comprise a communication link connected to a communication connector of the module and second independent communication links extending between two communication connectors of the module, and wherein the energy transmission device comprises a control unit connected by a communication link to at least one module, in a manner capable of at least one action selected from the group consisting of (i) transmitting orders thereto and (ii) receiving information.